US012231920B2

(12) United States Patent
Oktay et al.

(10) Patent No.: US 12,231,920 B2
(45) Date of Patent: Feb. 18, 2025

(54) NETWORK SLICES FOR TIME SENSITIVE NETWORKING

(71) Applicant: Juniper Networks, Inc., Sunnyvale, CA (US)

(72) Inventors: Oguz Oktay, Sunnyvale, CA (US); Sukhdev S. Kapur, Saratoga, CA (US); Arda Akman, San Ramon, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 56 days.

(21) Appl. No.: 17/656,495

(22) Filed: Mar. 25, 2022

(65) Prior Publication Data

US 2023/0308898 A1    Sep. 28, 2023

(51) Int. Cl.
*H04W 24/02* (2009.01)
*H04W 28/10* (2009.01)
(Continued)

(52) U.S. Cl.
CPC ........... *H04W 24/02* (2013.01); *H04W 28/10* (2013.01); *H04W 28/26* (2013.01); *H04W 40/02* (2013.01)

(58) Field of Classification Search
CPC . H04W 28/02; H04W 28/0268; H04W 28/16; H04W 28/18; H04W 28/24; H04W 28/26; H04W 28/10; H04W 76/11; H04W 76/12; H04W 24/02; H04W 24/04; H04W 40/02; H04W 40/24; H04W 56/001; H04L 47/28; H04L 47/283; H04L 47/2416
See application file for complete search history.

(56) References Cited

U.S. PATENT DOCUMENTS

| 2022/0174514 | A1* | 6/2022 | Kahn | ..................... H04W 48/18 |
| 2022/0264443 | A1* | 8/2022 | Lee | ....................... H04W 60/00 |
| 2023/0336492 | A1* | 10/2023 | Katsalis | ............ H04W 28/0268 |

FOREIGN PATENT DOCUMENTS

| EP | 3684137 A1 | 7/2020 |
| WO | 2020204949 A1 | 10/2020 |
| WO | 2020245679 A1 | 12/2020 |

OTHER PUBLICATIONS

Bhattacharjee et al., "Network Slicing for TSN-Based Transport Networks", IEEE Access, vol. 9, IEEE, Apr. 2021, pp. 62788-62809.

(Continued)

*Primary Examiner* — Peter Chen
(74) *Attorney, Agent, or Firm* — Shumaker & Sieffert, P.A.

(57) ABSTRACT

An example network system includes In one example, a network system includes a service orchestrator for managing a mobile network. The service orchestrator is configured to: receive, from a centralized network controller (CNC) for a time sensitive networking (TSN) application, TSN configuration data for a TSN flow between two end station devices for the TSN application; generate, based on the TSN configuration data, an intent to create a network slice in the mobile network to transport packets for the TSN flow; provision the network with the network slice based on the intent, wherein the network slice is associated with slice identification data; and output the slice identification data to cause a user equipment (UE) device attached to the mobile network to map packets for the TSN flow, received from one of the two end station devices, to the network slice.

18 Claims, 7 Drawing Sheets

(51) Int. Cl.
  *H04W 28/26* (2009.01)
  *H04W 40/02* (2009.01)

(56) References Cited

OTHER PUBLICATIONS

Extended Search Report from counterpart European Application No. 22179629.5 dated Nov. 17, 2022, 12 pp.
"5G; 5G System (5GS); Device-Side Time Sensitive Networking (TSN) Translator (DS-TT) to Network-Side TSN Translator (NW-TT) protocol aspects; Stage 3," 3GPP TS 24.535 version 16.3.0 Release 16, Jan. 2021, 12 pp.
"Time-Sensitive Networking: A Technical Introduction," White Paper, Cisco, May 2017, 8 pp.
Response to Extended Search Report dated Nov. 17, 2022, from counterpart European Application No. 22179629.5 filed Mar. 25, 2024, 22 pp.

* cited by examiner

NETWORK SLICES FOR TIME SENSITIVE NETWORKING

TECHNICAL FIELD

The disclosure relates to computer networking, and more specifically, to mobile network slices for time sensitive networking.

BACKGROUND

Computer networks have become ubiquitous, and the number of network applications, network-connected devices, and types of network-connected devices are rapidly expanding. Such devices now include computers, smart phones, Internet-of-Things (IoT) devices, vehicles, medical devices, factory equipment, etc. 5G network architectures enhanced the ability to provide communication services using cloud-based network function virtualization (NFV). Specialized networks can be created using the Radio Access Network (RAN) of a mobile network operator combined with functions of a 5G core. For example, networks can be created for a specific service level agreement (SLA), special use cases, or other specific requirements. Examples of such networks include private mobile networks, industrial networks, a dedicated network for connected vehicles, etc.

Time sensitive networking (TSN) is traditionally used in high precision industrial applications that operate using highly synchronized and time sensitive communications. These applications are often control applications that run on industrial or other devices to control them in predictable time sensitive responses. These applications require deterministic and bounded low-latency communications.

SUMMARY

In general, the disclosure describes techniques for creating and/or managing one or more network slices in a network to facilitate time sensitive networking (TSN). One or more user equipment (UE) devices which may be attached to TSN end devices (e.g., end stations) may then communicate via the mobile network using the one or more network slices in order to meet TSN requirements between the TSN end devices. In some examples, a service management and orchestration (SMO) system may provision one or more network slices that are capable of deterministic communications to allow the UE devices to communicate via the network over the one or more network slices satisfying TSN requirements.

In some examples, the SMO system may communicate with a central network controller (CNC), and configure the network slices based on one or more instructions received from the CNC. For example, a service orchestrator of the SMO system may receive a request from the CNC, the request indicating a set of flows. For example, the request may include a set of endpoints that define the set of flows with certain TSN communication requirements included in the request. The service orchestrator may translate the request in order to identify the set of endpoints and generate a set of network slice intents based on the set of endpoints. The service orchestrator may output one or more instructions to configure network elements to support the set of network slices. Additionally, or alternatively, the service orchestrator may generate network slice identification data for each network slice. The service orchestrator may output the network slice identification data to one or more user equipment (UE) devices. In some examples, the network slice identification data includes single network slice selection assistance information (S-NSSAI) corresponding to each network slice of the set of network slices. A UE device in possession of network slice identification data may be configured to communicate via the network slice associated with the network slice identification data.

In one example, a network system includes a service orchestrator for managing a mobile network. The service orchestrator is configured to: receive, from a centralized network controller (CNC) for a time sensitive networking (TSN) application, TSN configuration data for a TSN flow between two end station devices for the TSN application; generate, based on the TSN configuration data, an intent to create a network slice in the mobile network to transport packets for the TSN flow; provision the network with the network slice based on the intent, wherein the network slice is associated with slice identification data; and output the slice identification data to cause a user equipment (UE) device attached to the mobile network to map packets for the TSN flow, received from one of the two end station devices, to the network slice.

In another example, a method includes: receiving, by a service orchestrator that manages a mobile network, from a centralized network controller (CNC) for a time sensitive networking (TSN) application, TSN configuration data for a TSN flow between two end station devices for the TSN application; generating, by the service orchestrator based on the TSN configuration data, an intent to create a network slice in the mobile network to transport packets for the TSN flow; provisioning, by the service orchestrator, the network with the network slice based on the intent, wherein the network slice is associated with slice identification data; and outputting, by the service orchestrator, the slice identification data to cause a user equipment (UE) device attached to the mobile network to map packets for the TSN flow, received from one of the two end station devices, to the network slice.

In some examples, a non-transitory computer-readable medium comprising instructions for causing one or more processors of a service orchestrator that manages a mobile network to: receive, from a centralized network controller (CNC) for a time sensitive networking (TSN) application, TSN configuration data for a TSN flow between two end station devices for the TSN application; generate, based on the TSN configuration data, an intent to create a network slice in the mobile network to transport packets for the TSN flow; provision the network with the network slice based on the intent, wherein the network slice is associated with slice identification data; and output the slice identification data to cause a user equipment (UE) device attached to the mobile network to map packets for the TSN flow, received from one of the two end station devices, to the network slice.

The details of one or more examples are set forth in the accompanying drawings and the description below. Other features, objects, and advantages will be apparent from the description and drawings, and from the claims.

DETAILED DESCRIPTION

Figure 1:
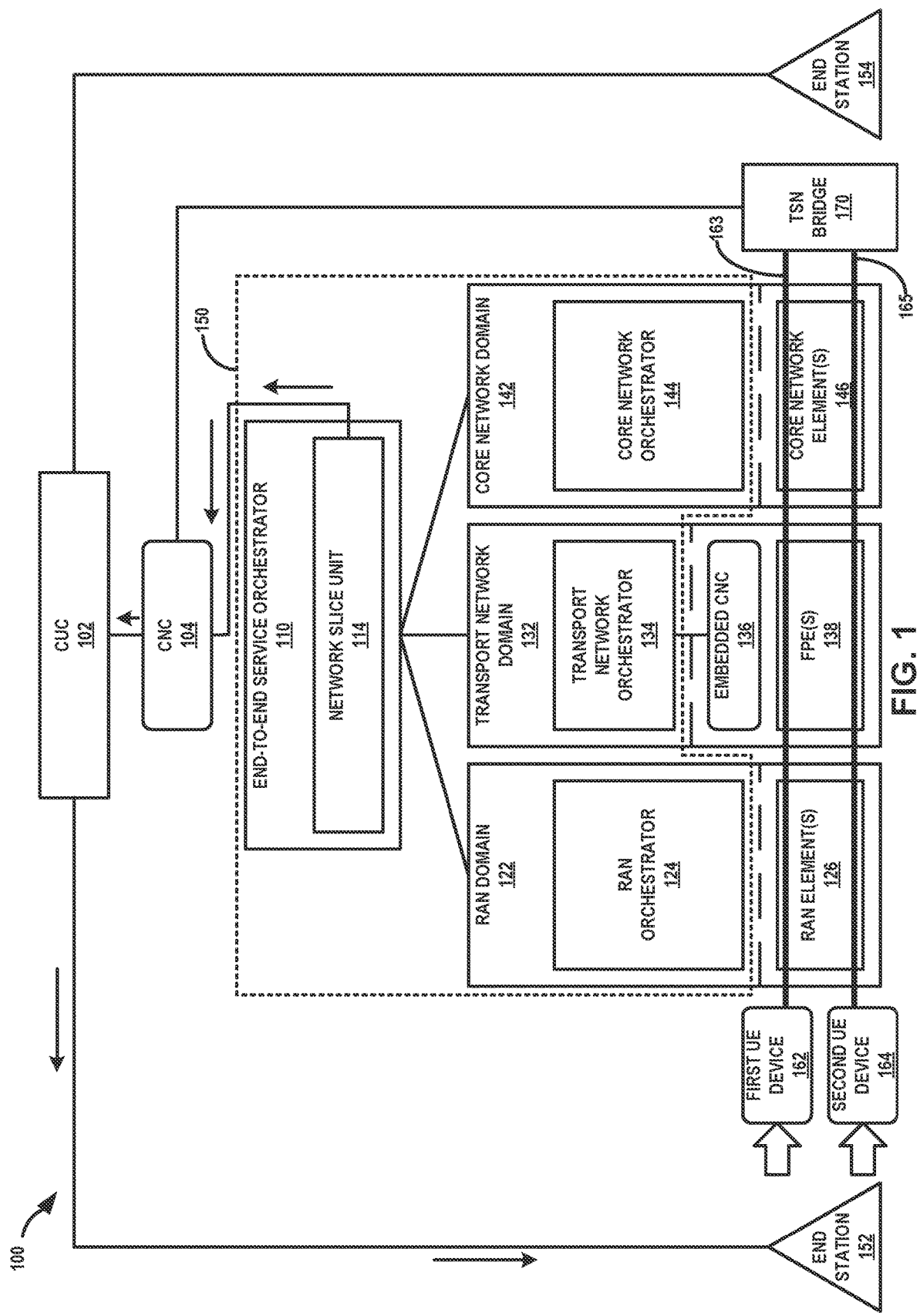
FIG. 1 is a block diagram illustrating a first example network system, in accordance with one or more techniques of this disclosure.

FIG. 1 is a block diagram illustrating a first example network system, in accordance with one or more techniques of this disclosure. In the example illustrated in FIG. 1, network system 100 includes the centralized user configuration (CUC) 102, a central network controller (CNC) 104, a service orchestrator 110 including a network slice unit 114, a radio access network (RAN) domain 122, a transport network domain 132, and a core network domain 142. The RAN domain 122 includes a RAN domain orchestrator 124 and one or more RAN elements 126. The transport network domain 132 includes a transport network domain orchestrator 134, an embedded CNC 136, and forwarding path element(s) 138. Core network domain 142 includes a core network domain orchestrator 144, and one or more core network elements 146. A service management and orchestration (SMO) unit 150 includes service orchestrator 110, RAN domain orchestrator 124, transport network domain orchestrator 134, and core network domain orchestrator 144.

Time sensitive networking (TSN) may refer to one or more network standards that define communication of packets over a network, such as network system 100 of FIG. 1. When a network implements TSN, one or more devices connected to the network may be synchronized such that each device of the one or more devices knows a current network time, and the one or more devices work in synchrony to transmit information over the network in a more time-efficient manner as compared with networks that do not implement TSN. For example, a central time source may distribute one or more time synchronization instructions to endpoint devices. Once the endpoint devices receive time synchronization instructions, it may be possible for endpoint devices to communicate over the network according to one or more TSN protocols. In some examples, the network may use the precision time protocol (PTP), the generic PTP (gPTP), or another protocol in order to time synchronize one or more devices one or more devices within the network.

Additionally, or alternatively, one or more TSN protocols may perform traffic shaping in order to solve packet agglomerations more efficiently as compared with networks that do not implement TSN. Packet agglomerations occur when network traffic overwhelms one or more nodes (e.g., switches and/or routers) in the network. Packets may have priority levels so that the network can prioritize some packets over others when packet agglomerations occur. For example, a packet may be assigned one of eight different priority levels. High priority levels may indicate high priority network traffic and low priority levels may indicate low priority network traffic.

In some examples, CUC 102 is configured to communicate with CNC 104. In some examples, CUC 102 is configured to communicate with CNC 104 using representational state transfer application programming interfaces (REST APIs). CUC 102 is configured to output one or more instructions to CNC 104 in order to control CNC 104 to configure aspects of network system 100. In some examples, CUC 102 may be configured to output a request to CNC 104 to determine a network topology of network system 100. CNC 104 may use link layer discovery protocol (LLDP) and a seed device in order to discover each device of the physical topology of network system 100 and how they are connected, including end devices. After CNC 104 determines the network topology, CUC 102 may issue a request for the CNC 104 to return the discovered topology. The network topology may, in some cases, include a topology of the one or more RAN elements 126, the one or more forwarding path elements (FPEs) 138, and the core network elements 146. Additionally, or alternatively, the network topology may include a topology of end station 152, end station 154, first UE device 162, second UE device 164, TSN bridge 170, FPEs 138, or any combination thereof. In some examples, CUC 102 may output one or more instructions to synchronize a time of one or more devices within network system 100. In some examples, CUC 102 may generate requests to create one or more flows based on the determined network topology. In some examples, the one or more flows may represent frame retransmission elimination for reliability (FRER) flows.

In some examples, CUC 102 may identify one or more network resources corresponding to one or more endpoints (e.g., end station 152 and end station 154). For example, CUC 102 may determine latency requirements for communication between end station 152 and end station 154 (e.g., end station 154 must receive network traffic from end station 152 within 500 microseconds (μs) from the start of transmission). Additionally, or alternatively, CUC 102 may determine a maximum size of a packet to be sent between end station 152 and end station 154. CUC 102 may determine one or more other dependencies (e.g., whether there is a sequence order to the TSN flows). CUC 102 may send the one or more network resources to CNC 104 using an application programming interface (API).

CUC 102 may send one or more requests to create the one or more flows to CNC 104. In some examples, the one or more requests may indicate the end station 152 and the end station 154 as endpoints. In some examples, CUC 102 may communicate with the end station 152 and/or the end station 154 in order to configure the end station 152 and/or the end station 154 in order to support the one or more requested flows between the end station 152 and the end station 154.

In some examples, CUC 102 may determine that CNC 104 has identified the topology of the physical network, and that CNC 104 has received all TSN flow requests. CUC 102 may send a request for CNC 104 to compute a schedule for the one or more TSN flows. CNC 104 may send, to CUC 102, a message indicating a success or a failure of computing the schedule. CNC 104 may be able to determine the schedule once CNC 104 discovers the physical topology. In some examples, CUC 102 may request that CNC 104 return the computed schedule. The computed schedule may, in some examples, include details for each device included in the one or more TSN flows. The details may include information that end devices (e.g., end station 152 and end station 154) and TSN bridges (e.g., TSN bridge 170) use to communicate according to the one or more TSN flows. In some examples, the details included in the computed schedule may include one or more unique identifiers for each TSN flow, a start and end of transmit window at each hop, a start and end of receive window at each hop, and an end-to-end latency.

In response to determining that the computed schedule is satisfactory, CUC 102 may send a request for CNC 104 to distribute the computed schedule to TSN bridge 170. CUC 102 may program end station 152 and end station 154 in order to support the one or more requested TSN flows.

CNC 104 may, in some cases, receive one or more requests from CUC 102. CNC 104 may, in some examples, be able to communicate with CUC 102, service orchestrator 110, one or more user equipment (UE) devices (e.g., first UE device 162 and second UE device 164), and one or more TSN bridges (e.g., TSN bridge 170). In some examples, the CNC includes a proxy for the network (e.g., one or more TSN bridges, one or more UE devices, and/or one or more end stations). CNC 104 may control one or more TSN bridges (e.g., TSN bridge 170) in the network system 100. CNC 104 may represent a software application running on customer premises (as opposed to cloud). In some examples, CNC 104 may determine routes and scheduling for TSN flows through TSN bridge 107. In some examples, CNC 104 may configure TSN bridge 170 for operation.

In some examples, CNC 104 communicates with CUC 102 to retrieve one or more communications requirements for one or more requested flows between end station 152 and end station 154. CNC 104 may collect the one or more requests received from CUC 102 and the communications requirements received from CUC 102. Based on the one or more requests and the communications requirements, CNC 104 may compute one or more TSN flows between end station 152 and end station 154, CNC 104 may schedule end-to-end transmission for each TSN flow, and transfer the computed schedule to TSN bridge 170. To compute the schedule, CNC 104 may provide a unique identifier for each TSN flow. This unique identifier may be used by TSN bridges to differentiate one TSN flow from another. The unique identifier may include the destination media access control (MAC) address, virtual local area network identification (VLAN ID), and a class of service (CoS) value. With these three items, the TSN bridges may identify the TSN flow and transmit the flow based on the correct schedule.

CNC 104 may generate TSN configuration data. In some examples, the TSN configuration data represents information for configuring one or more TSN flows between a pair of endpoints (e.g., between end station 152 and end station 154. The TSN configuration data may be used to implement the computed schedule. A TSN flow may be configured to carry network traffic (e.g., packets) across a network according to one or more TSN protocols. For example, the TSN configuration data may include information for configuring a first TSN flow between end station 152 and end station 154 via first UE device 162 and TSN bridge 170. Additionally, or alternatively, the TSN configuration data may include information for configuring a second TSN flow between end station 152 and end station 154 via second UE device 164 and TSN bridge 170.

CUC 102 provides an interface for use by end station 152 and end station 154 to provision communication services. In some aspects, CUC 102 can present a user interface that presents user interface elements (e.g., screens, menus, maps, etc.) as part of a workflow for provisioning a communication service. In some aspects, the user interface and workflow can be an "end-to-end" workflow such that when the workflow is completed, there is enough information available to provisioning portal to create service order that can be used by service orchestrator 110 for provisioning a desired communication service.

End station 152 and end station 154 (collectively, "end stations 152, 154") can be or include computing devices that execute a TSN application. Each of end stations 152, 154, can represent an industrial robot, controller, or other industrial apparatus, a network device such an Ethernet switch or router, a sensor, a conveyor, a motion controller, or other device implementing or requiring time-sensitive networking. End stations 152, 154 may alternatively be referred to as endpoint devices, endpoints, or end devices of one or more TSN flows. For example, one or more TSN flows may exist between end station 152 and end station 154. In some examples, each TSN flow of the one or more TSN flows may correspond to one or more network slices. For example, network slice 163 connects end station 152 with end station 154 via first UE device 162 and TSN bridge 170, and network slice 165 connects end station 152 with end station 154 vie second UE device 164 and TSN bridge 170.

In some examples, TSN bridge 170 may represent a network device (e.g., an ethernet switch). TSN bridge 170 may be configured to transmitting and/or receiving frames of a TSN flow (e.g., TSN flows corresponding to network slice 163 and network slice 165) according to a schedule.

CUC 102 can be communicatively coupled to end station 152, and CNC 104 can be communicatively coupled to service orchestrator 110. In the example illustrated in FIG. 1, CUC 102 is executed in a computing environment, which may be provided by a cloud service provider. However, CUC 102 may be executed in other environments. Service orchestrator 110 may be a component of a server or other computing device in a data center, such as a data center of a mobile network operator. In addition, some operations attributed herein to CUC 102, CNC 104, or service orchestrator 110 may in various examples be performed by CUC 102, CNC 104, or service orchestrator 110.

In some aspects, communication services that may be provisioned using service orchestrator 110 include network slices. In 5G network environments, network slicing facilitates creations of multiple virtualized and independent logical networks that are multiplexed over the same physical network infrastructure. A network slice can be logically isolated from other network slices and can be customized to meet service level expectations of an application that may be established by a service level agreement (SLA). In the example illustrated in FIG. 1, service orchestrator 110 can create and allocate network slices on the network system 100.

Service orchestrator 110 may receive the TSN configuration data from CNC 104. Service orchestrator 110 may include a network slice unit 114 that is configured to process the TSN configuration data and control the network system 100 to implement one or more TSN flows. In some examples, network slice unit 114 may convert the TSN configuration data into one or more network slice intents. Network slice unit 114 may translate the TSN configuration data in order to identify one or more endpoints. In some examples, network slice unit 114 may be referred to as a "TSN to Slice Translator." Network slice unit 114 may create a network slice intent corresponding to one or more TSN flows specified in the TSN configuration data. For example, network slice unit 114 may create a first network slice intent for a first network slice 163 between first UE device 162 and TSN bridge 170, and network slice unit 114 may create a second network slice intent for a second network slice 165 between second UE device 164 and TSN bridge 170. First network slice 163 may correspond to a first one or more TSN flows indicated by the TSN configuration data. Second network slice 165 may correspond to a second one or more TSN flows indicated by the TSN configuration data. Alternatively, network slice unit 114 may reuse an existing network slice for the TSN flows for any of UE devices 162 and 164. For example, service orchestrator 110 may pre-provision network slices in the mobile network domains in anticipation of transporting TSN flows.

The mobile network of FIG. 1 is a multi-domain network including RAN domain 122, transport network domain 132, and core network domain 142. Service orchestrator 110 may output one or more instructions to RAN domain orchestrator 124, transport network orchestrator 134 for transport network domain, and/or core network orchestrator 144 for core network domain 142 in order to implement each network slice intent of the one or more network slice intents generated based on the TSN configuration information. Service orchestrator 110 may leverage the RAN domain orchestrator 124, transport network domain 132, and/or core network domain 142 in order to create the first network slice 163 between first UE device 162 and TSN bridge 170 and the second network slice 165 between second UE device 164 and TSN bridge 170. For example, RAN domain orchestrator 124 may execute a RAN network slice subnet management function (RAN NSSMF), transport network domain orchestrator 134 may execute a transport network NSSMF (TN NSSMF), and core network domain orchestrator 144 may execute a core network NSSMF (CORE NSSMF). Service orchestrator 110 may leverage the RAN NSSMF and the CORE NSSMF in order to create a TSN slice subnet management function corresponding to each network slice intent of the one or more network slice intents.

RAN domain 122 may include RAN domain orchestrator 124 and one or more RAN elements 126. In some examples, RAN domain orchestrator 124 may configure the one or more RAN elements 126 in order to connect one or more UE devices to the transport network domain 132 and the core network domain 142. RAN elements 126 may include one or more wireless towers and/or antennas that are configured to communicate wirelessly with UE devices. In some examples, one or more RAN elements 126 includes radio units (RUs) located at various cellular network sites ("cell sites"), along with distributed units (DUs) and centralized units (CUs). Each RU consists of an LO PHY and a RF transmitter. The LO PHY component may be implemented using specialized hardware for high-performance packet processing.

RUs can connect to DUs via a fronthaul network. The fronthaul network connects LO PHY and HI PHY and is used by RUs and DUs to implement the F2 interface of 5G. DUs manage the packet transmission of radio by the RUs. In some cases, such packet transmission conforms to the Common Packet Radio Interface (CPRI) and/or to the enhanced CPRI (eCPRI) standard, or to IEEE 1914.3. DUs may implement the Radio Link Control (RLC), Media Access Control (MAC), and the HI PHY layer. DUs are at least partially controlled by CUs.

DUs can connect to CUs via a mid-haul network, which may be used by DUs and CUs to implement the F1 interface of 5G. CUs may implement the Radio Resource Control (RRC) and Packet Data Convergence Protocol (PDCP) layers. CUs connect to core 105 via a backhaul network. The midhaul and backhaul networks may each be wide area networks (WANs).

In some examples, the one or more RAN elements 126 may include a gNodeB base station. In some examples, the gNodeB base station includes a CU and a DU. In some examples, the CU may support multiple DUs in order to implement multiple gNodeB base stations. Further, one or more radio hardware units (RUs) may be supported by a single DU.

Any DU may or may not be located at the cell site that includes the RU(s) supported by the DU. A DU may be located at a cell site, while other DUs may be located at a local data center and collectively support multiple RUs. Network system 100 may have radio access networks within the RAN domain 122 that include many thousands of cell sites and gNodeBs. RAN domain 122 may connect to core network domain 142 via transport network domain 132. Core network domain 142 may comprise a 5G core network.

Transport network domain 132 may provide connectivity between RAN domain 122 and core network domain 142. Additionally, or alternatively, transport network domain 132 may provide connectivity between disaggregated RAN network functions (e.g., a midhaul connection between DU and CU. 142. Transport network domain 132 may include transport network domain orchestrator 134, embedded CNC 136, and one or more FPEs 138. In some examples, the transport network domain 132 may include one or more network devices (e.g., routers and/or switches) that represent the one or more FPEs 138. One or more of FPEs 138 may be TSN bridges. The transport network domain orchestrator 134 and/or embedded CNC 136 may configure the FPEs 138 in order to connect the RAN domain 122 and the core network domain 142, and connect disaggregated RAN network functions. For example, the FPEs 138 may receive network traffic from the one or more RAN elements 126 and forward the network traffic to the one or more core network elements 146. In some examples, it may be beneficial for the transport network domain orchestrator 134 and/or embedded CNC 136 to configure the one or more FPEs in order to support one or more network slices.

Core network domain 142 may include core network domain orchestrator 144 and one or more core network elements 146. In some aspects, resources associated with service to w tenant may be provided by, or managed by, functions of core network domain 142 and/or components of RAN domain 122. In some aspects, core network domain 142 implements various discrete control plane and user plane functions for network system 100. In some aspects, the core network domain orchestrator 144 of core network domain 142 includes 5G control plane functions such as Access Mobility Management Function (AMF), Session Management Function (SMF), Policy Control Function (PCF), User Data Management (UDM), Network Repository Function (NRF), Authentication Server Function (AUSF), and Network Slice Selection Function (NSSF). AMF may provide access mobility management services. SMF may provide session management services. PCF may provide policy control services. Unified Data Management (UDM) function may manage network user data. AUSF may provide authentication services. Network Repository Function (NRF) may provide a repository that can be used to register and discover services in a network operator's network. Network Slice Selection Function (NSSF) may be used to select an instance of an available network slice for use by a UE device (e.g., first UE device 162 and/or second UE device 164). The one or more core network elements 146 may include User Plane Functions (UPFs). UPFs may provide packet routing, forwarding and other network data processing functions (e.g., Quality of Service, packet inspection, traffic optimization etc.).

In some examples, service orchestrator 110 may be configured to receive, from CNC 104, TSN configuration data. The TSN configuration data may indicate end station 152 and end station 154 as endpoints. In some examples, the TSN configuration data may indicate one or more requested TSN flows between end station 152 and end station 154. In some examples, service orchestrator 110 may determine one or more TSN flows based on the TSN configuration data. For example, a first TSN flow may connect end station 152 and end station 154 via first UE device 162 and TSN bridge 170, and a second TSN flow may connect end station 152 and end station 154 via second UE device 164 and TSN bridge 170. Network slice unit 114 may translate the TSN configuration data in order to generate one or more network slice intents. For example, network slice unit 114 may generate a first network slice intent corresponding to the requested TSN flow between the first UE device 162 and TSN bridge 170, and network slice unit 114 may generate a second network slice intent corresponding to the requested TSN flow between the second UE device 164 and TSN bridge 170. Although described with respect to two separate slices 163 and 165 and two separate UE devices 162 and 164, the techniques of this disclosure are applicable to provisioning a single network slice to which a single UE may map TSN flows.

In some examples, to generate the first network slice intent and the second network slice intent, network slice unit 114 may add some information to the network slice intents that is not present in the TSN configuration data. For example, although the TSN configuration data may indicate end stations 152, 154 as endpoints of the requested TSN flows, the TSN configuration data received from CNC 104 might not include some information for configuring one or more elements of the RAN domain 122, the transport network domain 132, and/or the core network domain 142 in order to support the flows. When network slice unit 114 converts TSN configuration data into the first network slice intent and the second network slice intent, network slice unit 114 may generate the network slice intent to include information for leveraging RAN domain orchestrator 124, transport network domain orchestrator 134, and/or core network domain orchestrator 144 in order to configure these elements.

Based on the first network slice intent and the second network slice intent, service orchestrator 110 may leverage RAN domain orchestrator 124, transport network domain orchestrator 134, and/or core network domain orchestrator 144 in order to create a first network slice 163 corresponding to a first network slice intent and a second network slice 165 corresponding to a second network slice intent. For example, service orchestrator 110 may leverage a RAN NSSMF executing on the RAN domain orchestrator 124 and a CORE NSSMF executing on the core network domain orchestrator 144 in order to create a first TSN slice subnet management function corresponding to the first network slice intent and a second TSN slice subnet management function corresponding to the second network slice intent. Based on the first TSN slice subnet management function and the second TSN slice subnet management function, the RAN domain orchestrator 124, the transport network domain orchestrator 134, and the core network domain orchestrator 144 may manage the first network slice 163 and the second network slice 165.

In some examples, service orchestrator 110 is configured to leverage a TN NSSMF executing on the transport network domain orchestrator 134 in order to connect the first network slice 163 and the second network slice 165 across the one or more FPEs 138. For example, first network slice 163 and second network slice 165 may each be configured to handle an amount of network bandwidth. Service orchestrator 110 may leverage the TN NSSMF in order to configure the one or more FPEs 138 so that both of the first network slice 163 and the second network slice 165 support a full amount of allocated network bandwidth. In some examples, the one or more FPEs 138 may be located on network devices within one or more data centers of the transport network domain 132. The TN NSSMF may, in some examples, use a network slice controller in order to connect the first network slice 163 and the second network slice 165 across the one or more FPEs 138. For example, the network slice controller may configure the one or more FPEs 138 in order to support a latency, a jitter, an allocated amount of bandwidth, and a quality of service (QoS) associated with each of the first network slice 163 and the second network slice 165.

In some examples, embedded CNC 136 is configured to activate one or more TSN bridges within the transport network domain 132 on order to connect the first network slice 163 and the second network slice 165 across the one or more FPEs 138. In some examples, the one or more TSN bridges may span the one or more FPEs 138. Any of the FPEs 138 may include or represent a TSN bridge.

In some examples, when service orchestrator 110 leverages the RAN domain orchestrator 124, the transport network domain orchestrator 134, and/or the core network domain orchestrator 144 to create the first network slice 163 and the second network slice 165, service orchestrator 110 creates first slice identification data corresponding to the first network slice 163 and second slice identification data corresponding to the second network slice 165. Service orchestrator 110 may add the first slice identification data and the second slice identification data to a network slice selection assistance information (NSSAI) list. In some examples, the first slice identification data includes a first TSN slice identification corresponding to the first network slice 163 and the second slice identification data includes a second TSN slice identification corresponding to the second network slice 165. In some examples, the first slice identification data including the first TSN slice identification represents first single network slice selection assistance information (S-NSSAI) and the second slice identification data including the second TSN slice identification represents second S-NSSAI. Once the first network slice 163 and the second network slice 165 are created, first UE device 162 may communicate with TSN bridge 170 over the first network slice and second UE device 164 may communicate with TSN bridge 170 over the second network slice. In some examples, a device in possession of the first S-NSSAI may send packets over the first network slice 163 and a device in possession of the second S-NSSAI may send packets over the second network slice 165.

Service orchestrator 110 may output network slice identification data. For example, service orchestrator 110 may output first network slice identification data (e.g., a first S-NSSAI) to first UE device 162 and service orchestrator 110 may output second network slice identification data (e.g., a second S-NSSAI) to a second UE device 164. In some examples, service orchestrator 110 may output one or both of the first network slice identification data and the second network slice identification data to the CNC 104. CNC 104 may receive the first network slice identification data and the second network slice identification data and forward the first network slice identification data and the second network slice identification data to the CUC 102. The CUC 102 may receive the first network slice identification data and the second network slice identification data and forward the first network slice identification data and the second network slice identification data to the end station 152. The end station 152 may send the first network slice identification data to the first UE device 162. Additionally, or alternatively, the end station 152 may send the second network slice identification data to the second UE device 164.

In some examples, first UE device 162 may receive the first network slice identification data (e.g., a first S-NSSAI) and second UE device 164 may receive the second network slice identification data (e.g., a second S-NSSAI). While in possession of the first network slice identification data, first UE device 162 may be configured to communicate with TSN bridge 170 via the one or more RAN elements 126, the one or more FPEs 138, and the one or more core network elements 146 according to the first network slice 163. While in possession of the second network slice identification data, second UE device 164 may be configured to communicate with TSN bridge 170 via the one or more RAN elements 126, the one or more FPEs 138, and the one or more core network elements 146 according to the second network slice 165.

In some examples, service orchestrator 110 may output, to RAN domain orchestrator 124 an instruction to configure one or more RAN elements 126 in order to support the set of network slices. In response to the instruction, the RAN domain orchestrator 124 is configured to configure the one or more RAN elements 126 in order to support each network slice of the set of network slices. In some examples, service orchestrator 110 may output, the core network domain orchestrator 144, an instruction to configure one or more core network elements 146 in order to support the set of network slices. In response to receiving the instruction, the core network domain orchestrator 144 is configured to configure the one or more core network elements 146 in order to support each network slice of the set of network slices.

Figure 2:
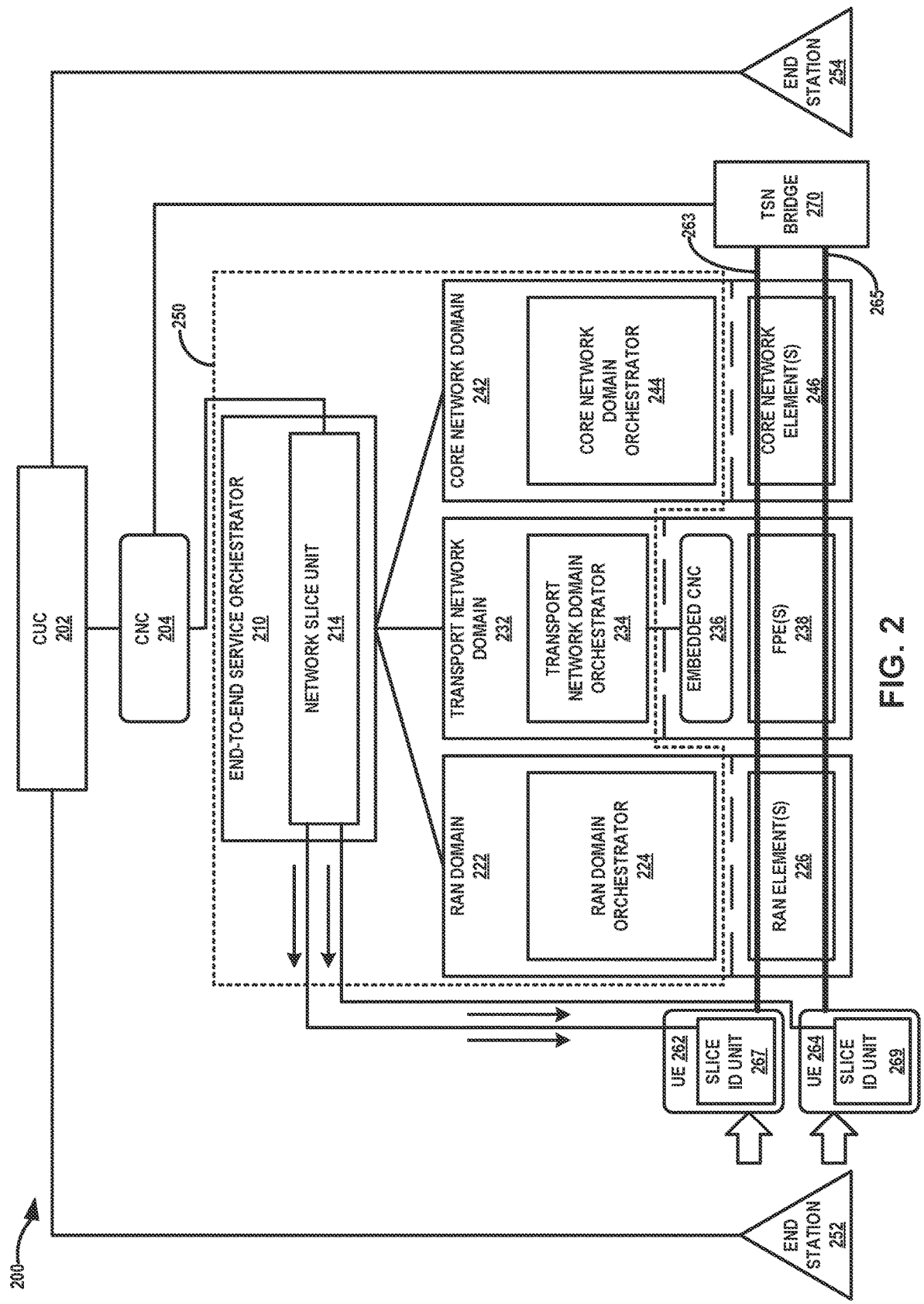
FIG. 2 is a block diagram illustrating a second example network system, in accordance with one or more techniques of this disclosure.

FIG. 2 is a block diagram illustrating a second example network system 200, in accordance with one or more techniques of this disclosure. In the example illustrated in FIG. 2, network system 200 includes CUC 202, CNC 204, a service orchestrator 210 including a network slice unit 214, a radio access network (RAN) domain 222, a transport network domain 232, and a core network domain 242. The RAN domain 222 includes a RAN domain orchestrator 224 and one or more RAN elements 226. The transport network domain 232 includes a transport network domain orchestrator 234, an embedded CNC 236, and forwarding path element(s) 238. Core network domain 242 includes a core network domain orchestrator 244, and one or more core network elements 246. A service management and orchestration (SMO) unit 250 includes service orchestrator 210, RAN domain orchestrator 224, transport network domain orchestrator 234, and core network domain orchestrator 244. Network system 200 includes end station 152, end station 154, first UE device 162, second UE device 164, and TSN bridge 170.

In some examples, network system 200 of FIG. 2 may be substantially the same as network system 100 of FIG. 1, except that service orchestrator 210 of FIG. 2 outputs network slice identification data directly to first UE device 262 and second UE device 264, whereas service orchestrator 110 outputs network slice identification data to first UE device 162 and second UE device 164 via CUC 102, CNC 104, and end station 154. For example, service orchestrator 210 may output first network slice identification data (e.g., a first S-NSSAI) to first UE device 262 and service orchestrator 210 may output second network slice identification data (e.g., a second S-NSSAI) to second UE device 264. Service orchestrator 210 may output the first network slice information data directly to first UE device 262. In some examples, service orchestrator 210 may output second network slice information dataset directly to second UE device 264. First UE device 262 includes a slice ID unit 267, and second UE device 264 includes a slice ID unit 269.

In some examples, first UE device 262 may receive the first network slice identification data and second UE device 264 may receive the second network slice identification data. While in possession of the first network slice identification data, first UE device 262 may be configured to communicate with TSN bridge 270 via the one or more RAN elements 226, the one or more FPEs 238, and the one or more core network elements 246 according to the first network slice 263. While in possession of the second network slice identification data, second UE device 264 may be configured to communicate with TSN bridge 270 via the one or more RAN elements 226, the one or more FPEs 238, and the one or more core network elements 246 according to the second network slice 265.

Figure 3:
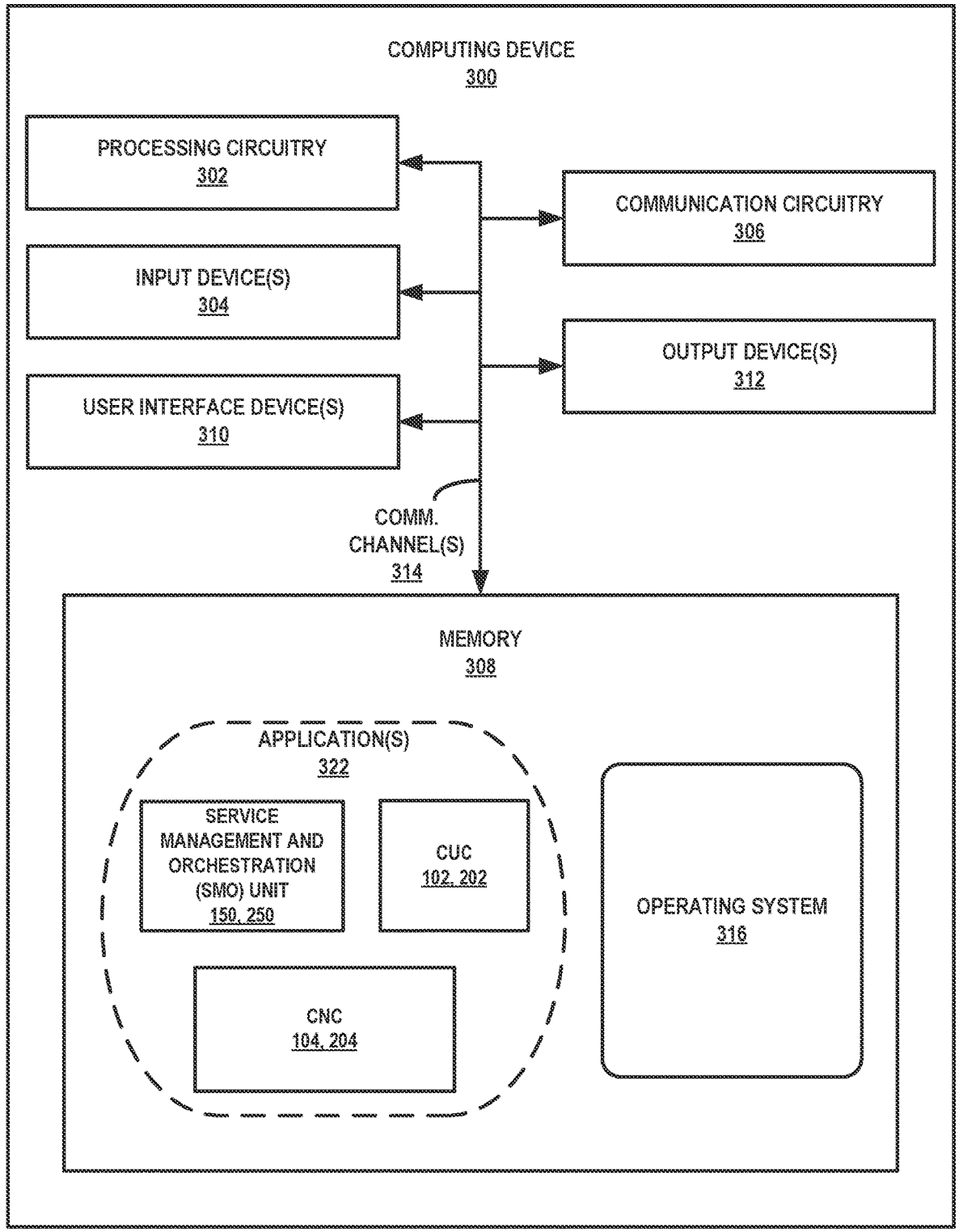
FIG. 3 is a block diagram illustrating further details of one example of a computing device, in accordance with one or more techniques of this disclosure.

FIG. 3 is a block diagram illustrating further details of one example of a computing device 300, in accordance with one or more techniques of this disclosure. FIG. 3 may illustrate a particular example of a server or other computing device 300 that includes processing circuitry 302 for executing any one or more of CUC 102, 202, CNC 104, 204, and SMO unit 150, 250, or any other system, application, node software, or module described herein. Other examples of computing device 300 may be used in other instances. Although shown in FIG. 3 as a stand-alone computing device 300 for purposes of example, a computing device may be any component or system that includes one or more processors or other suitable computing environment for executing software instructions and, for example, need not necessarily include one or more elements shown in FIG. 3 (e.g., communication circuitry 306; and in some examples components such as memory 308 may not be co-located or in the same chassis as other components). As shown in the specific example of FIG. 3, computing device 300 includes processing circuitry 302, one or more input devices 304, communication circuitry 306, one or more output device(s) 312, memory 308, and user interface (UI) device(s) 310. Computing device 300, in one example, further includes one or more applications 322 and operating system 316 that are executable by computing device 300. Each of components 302, 304, 306, 308, 310, and 312 are coupled (physically, communicatively, and/or operatively) for inter-component communications. In some examples, communication channels 314 may include a system bus, a network connection, an inter-process communication data structure, a message bus, or any other method for communicating data. As one example, components 302, 304, 306, 308, 310, and 312 may be coupled by one or more communication channels 314.

Processing circuitry 302, in one example, are configured to implement functionality and/or process instructions for execution within computing device 300. For example, processing circuitry 302 may be processing circuitry capable of processing instructions stored in memory 308. Examples of processing circuitry 302 may include, any one or more of a microprocessor, a controller, a digital signal processor (DSP), an application specific integrated circuit (ASIC), a field-programmable gate array (FPGA), or equivalent discrete or integrated logic circuitry.

Memory 308 may be configured to store information within computing device 300 during operation. Memory 308, in some examples, is described as a computer-readable storage medium. In some examples, memory 308 is a temporary memory, meaning that a primary purpose of memory 308 is not long-term storage. Memory 308, in some examples, is described as a volatile memory, meaning that memory 308 does not maintain stored contents when the computer is turned off. Examples of volatile memories include random access memories (RAM), dynamic random access memories (DRAM), static random access memories (SRAM), and other forms of volatile memories known in the art. In some examples, memory 308 is used to store program instructions for execution by processing circuitry 302. Memory 308, in one example, is used by software or applications running on computing device 300 to temporarily store information during program execution.

Memory 308, in some examples, also include one or more computer-readable storage media. Memory 308 may be configured to store larger amounts of information than volatile memory. Memory 308 may further be configured for long-term storage of information. In some examples, memory 308 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 300, in some examples, also includes communication circuitry 306. Computing device 300, in one example, utilizes communication circuitry 306 to communicate with external devices via one or more networks, such as one or more wired/wireless/mobile networks. Communication circuitry 306 may include a network interface card, such as an Ethernet card, an optical transceiver, a radio frequency transceiver, or any other type of device that can send and receive information. In some examples, computing device 300 uses communication circuitry 306 to communicate with an external device.

Computing device 300, in one example, also includes one or more user interface devices 310. User interface devices 310, in some examples, are configured to receive input from a user through tactile, audio, or video feedback. Examples of user interface devices(s) 310 include a presence-sensitive display, a mouse, a keyboard, a voice responsive system, video camera, microphone, or any other type of device for detecting a command from a user. In some examples, a presence-sensitive display includes a touch-sensitive screen.

One or more output devices 312 may also be included in computing device 300. Output device 312, in some examples, is configured to provide output to a user using tactile, audio, or video stimuli. Output device 312, in one example, includes a presence-sensitive display, a sound card, a video graphics adapter card, or any other type of device for converting a signal into an appropriate form understandable to humans or machines. Additional examples of output device 312 include a speaker, a cathode ray tube (CRT) monitor, a liquid crystal display (LCD), or any other type of device that can generate intelligible output to a user.

Computing device 300 may include operating system 316. Operating system 316, in some examples, controls the operation of components of computing device 300. For example, operating system 316, in one example, facilitates the communication of one or more applications 322 with processing circuitry 302, communication circuitry 306, memory 308, input device 304, user interface devices 310, and output device 312.

Application(s) 322 may also include program instructions and/or data that are executable by computing device 300. Example applications 322 executable by computing device 300 may include application and/or other software to implement capabilities described above. For example, applications 322 can include applications associated with CUC 102, 202, CNC 104, 204, and SMO unit 150, 250.

Figure 4:
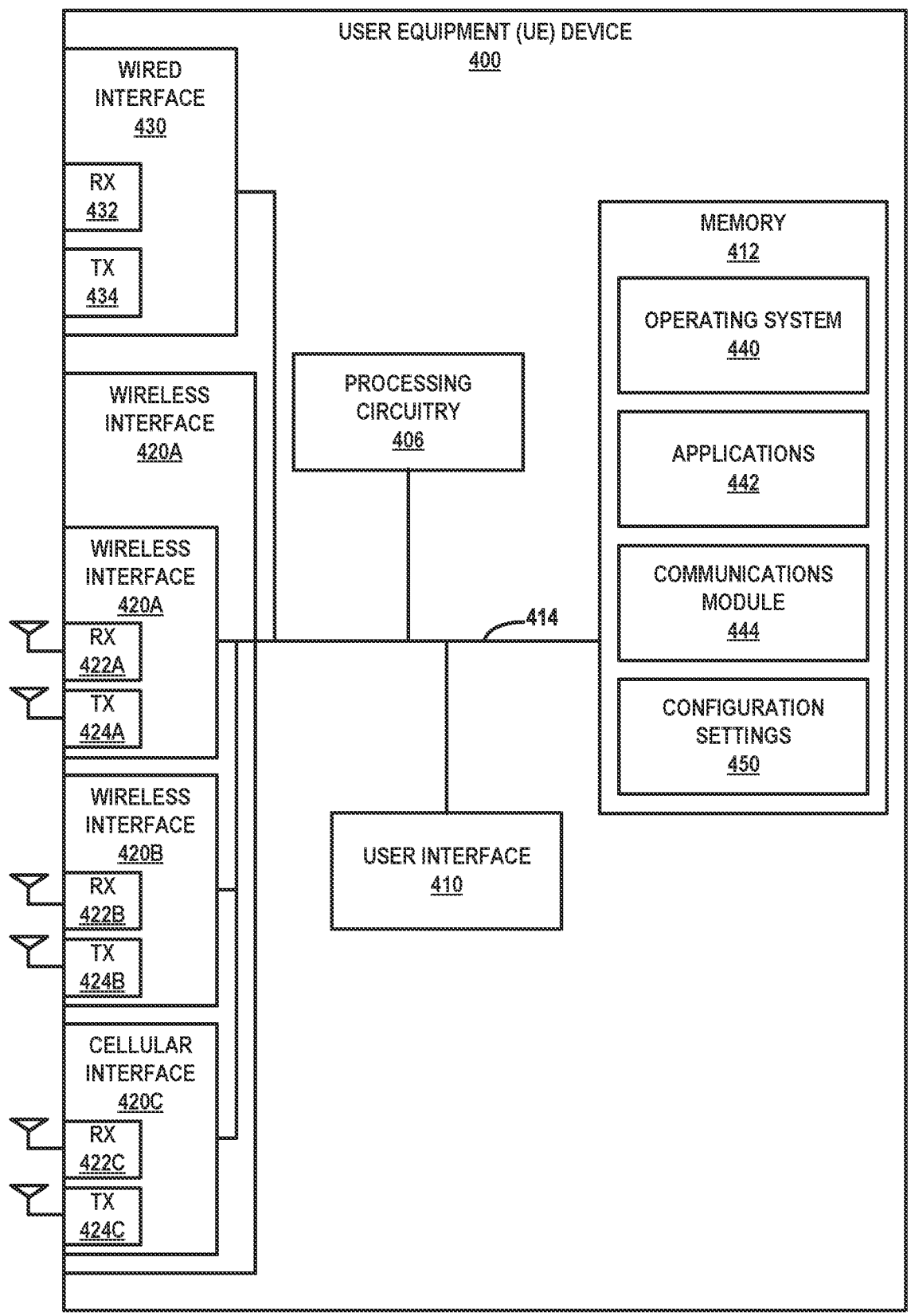
FIG. 4 is a block diagram illustrating an example user equipment (UE) device, in accordance with one or more techniques of this disclosure.

FIG. 4 is a block diagram illustrating an example UE device 400, in accordance with one or more techniques of this disclosure. Example UE device 400 shown in FIG. 4 may be an example of any of UE devices 162, 164, 262, 264 of FIGS. 1-2. UE device 400 may include any type of wireless and/or wired client device, and the disclosure is not limited in this respect. For example, UE device 400 may include a mobile device such as a smart phone, tablet or laptop computer, a personal digital assistant (PDA), a wireless terminal, a smart watch, a smart ring, or any other type of mobile or wearable device. UE device 400 may also include any type of IoT client device such as a printer, a security sensor or device, an environmental sensor, or any other connected device configured to communicate over one or more wireless and/or wired networks.

UE device 400 includes a wired interface 430, wireless interfaces 420A-420C, processing circuitry 406, memory 412, and a user interface 410. The various elements are coupled together via a bus 414 over which the various elements may exchange data and information. Wired interface 430 includes a receiver 432 and a transmitter 434. Wired interface 430 may be used, if desired, to couple UE device 400 to a network. UE devices are not required to have a wired interface. Some example UE devices may include wireless interfaces without a wired interface. First, second and third wireless interfaces 420A, 420B, and 420C include receivers 422A, 422B, and 422C, respectively, each including a receive antenna via which UE device 400 may receive wireless signals from wireless communications devices, such as RAN elements 126 of FIG. 1, RAN elements 226 of FIG. 2, or other devices configured for wireless communication. First, second, and third wireless interfaces 420A, 420B, and 420C further include transmitters 424A, 424B, and 424C, respectively, each including transmit antennas via which UE device 400 may transmit wireless signals to wireless communications devices, RAN elements 126 of FIG. 1, RAN elements 226 of FIG. 2, other UE devices and/or other devices configured for wireless communication. In some examples, first wireless interface 420A may include a Wi-Fi 802.11 interface (e.g., 2.4 GHz and/or 5 GHz) and second wireless interface 420B may include a Bluetooth interface and/or a Bluetooth Low Energy interface. Third wireless interface 420C may include, for example, a cellular interface through which UE device 400 may connect to a cellular network.

Processing circuitry 406 executes software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the processing circuitry 406 to perform the techniques described herein.

Memory 412 includes one or more devices configured to store programming modules and/or data associated with operation of user 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the processing circuitry 406 to perform the techniques described herein.

In this example, memory 412 includes an operating system 440, applications 442, a communications module 444, and configuration settings 450. Communications module 444 includes program code that, when executed by processing circuitry 406, enables UE device 400 to communicate using any of wired interface(s) 430, wireless interfaces 420A-420B and/or cellular interface 450C. Configuration settings 450 include any device settings for UE device 400 settings for each of wireless interface(s) 420A-420B and/or cellular interface 420C.

Figure 5:
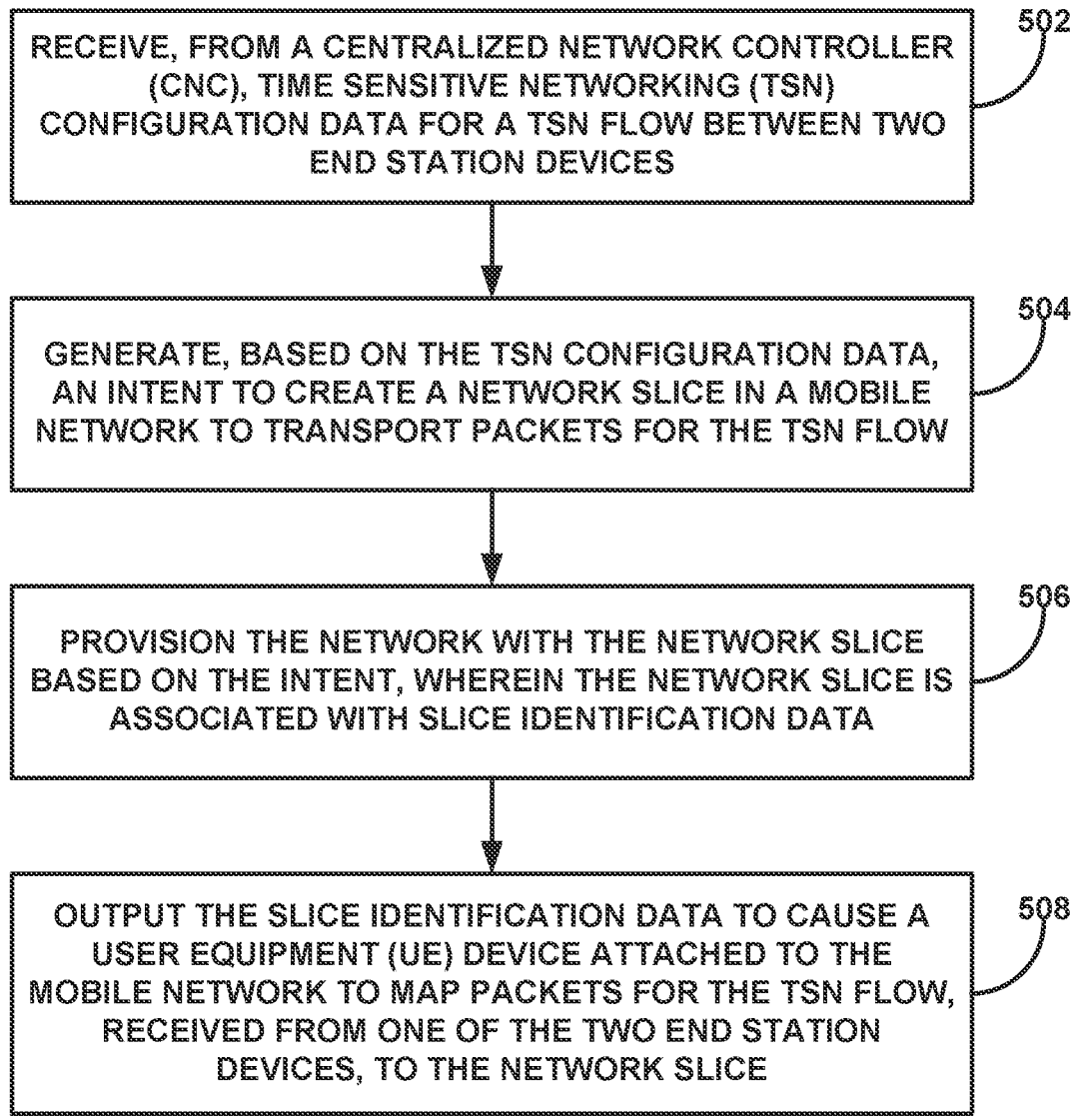
FIG. 5 is a flow diagram illustrating an example operation for configuring a set of network slices and outputting network slice identification data, in accordance with one or more techniques of this disclosure.

FIG. 5 is a flow diagram illustrating an example operation for configuring a set of network slices and outputting network slice identification data, in accordance with one or more techniques of this disclosure. For convenience, FIG. 5 is described with respect to network system 100 of FIG. 1 and network system 200 of FIG. 2. However, the techniques of FIG. 5 may be performed by different components of network system 100 of FIG. 1 and network system 200 of FIG. 2 or by additional or alternative devices.

Service orchestrator 110 is configured to receive, from CNC 104, TSN configuration data for a TSN flow between two end station devices (502). In some examples, the two end station devices may include end station 152 and end station 154. In some examples, service orchestrator 110 may configure the TSN flow without information indicating end station 152 and end station 154 as end station devices. Service orchestrator 110 may generate, based on the TSN configuration data, an intent to create a network slice in the mobile network to transport packets for the TSN flow (504). For example, network slice unit 114 of service orchestrator 110 may translate the TSN configuration data in order to identify end station 152 and end station 154. In some examples, the intent to create the network slice includes indications of end station 152 and end station 154 and one or more instructions for provisioning the network to implement the network slice.

Service orchestrator 110 may provision the network with the network slice based on the intent, where the network slice is associated with slice identification data (506). In some examples, a radio access network (RAN) orchestrator 124 is configured to manage one or more RAN elements 126, a transport network orchestrator 134 is configured to manage one or more forwarding path elements (FPEs) 138, and a core network orchestrator 144 is configured to manage one or more core network elements 146. In some examples, to provision the network with the network slice based on the intent, the service orchestrator 110 is configured to leverage the RAN orchestrator 124, the transport network orchestrator 134, and the core network orchestrator 144 in order to configure the one or more RAN elements 126, the one or more FPEs 128, and the one or more core network elements 146 in order to support the network slice.

Service orchestrator 110 may output the slice identification data to cause a UE device attached to the mobile network to map packets for the TSN flow, received from one of the two end station devices, to the network slice (508). For example, service orchestrator 110 may output the slice identification data to first UE device 162. In another example, service orchestrator 110 may output the slice identification data to second UE device 164. When in possession of the slice identification data, first UE device 162 is configured to communicate with TSN bridge 170 via the network slice. When in possession of the slice identification data, second UE device 164 is configured to communicate with TSN bridge 170 via the network slice. A UE device may map a TSN flow to a network slice identified by slice identification data using a ruleset that maps properties of packets for the TSN flow to the slice identification data, which causes the UE to use the identified slice for such packets. When a UE attached to a RAN, the slice identification data for a TSN slice may be included in a list of allowed slices. As described above, another system will inform the UE which slice is to be used for TSN flows.

Figure 6:
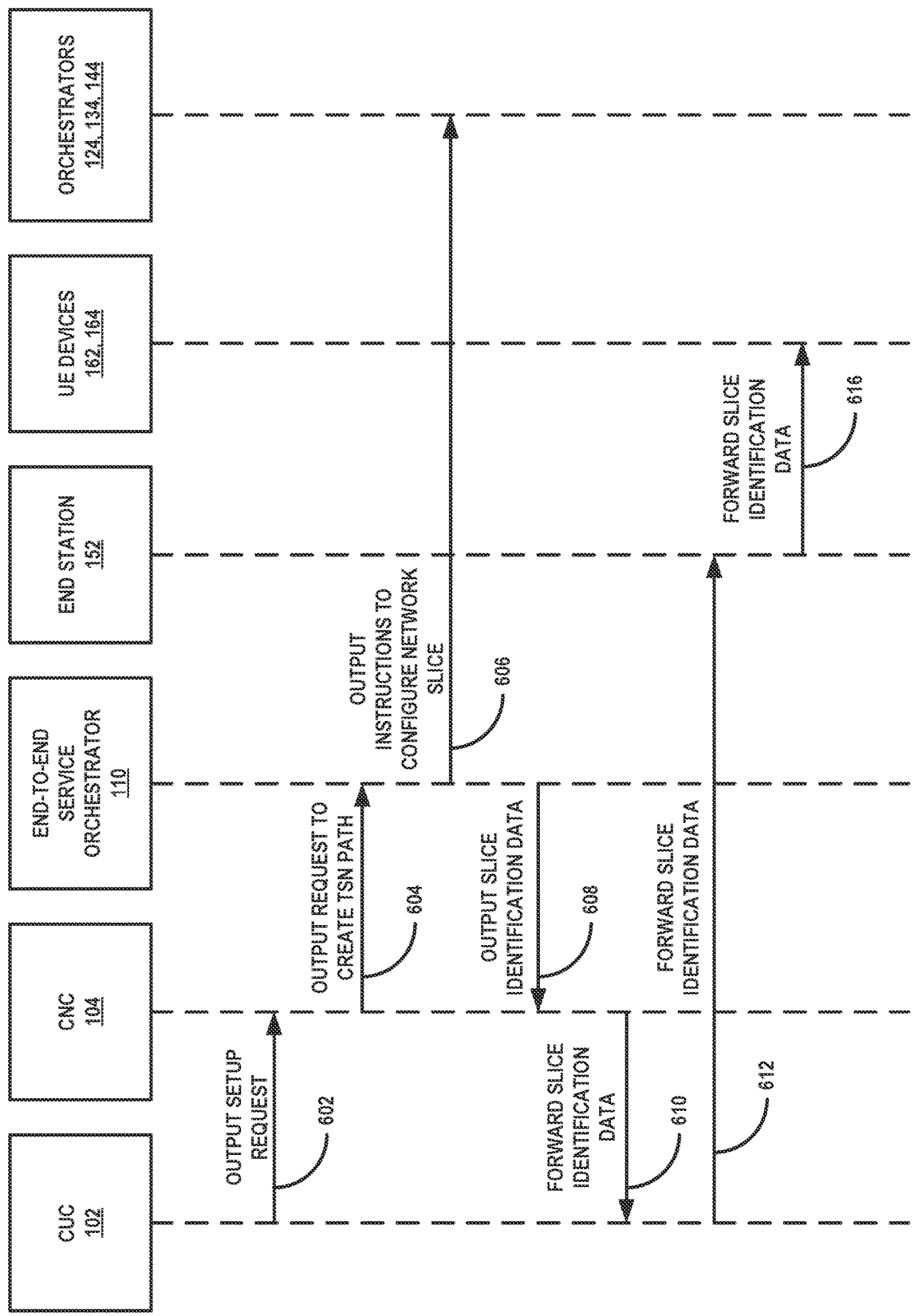
FIG. 6 is a flow diagram illustrating a first example operation for sending network slice identification data to a set of UE devices, in accordance with one or more techniques of this disclosure.

FIG. 6 is a flow diagram illustrating a first example operation for sending network slice identification data to a set of UE devices, in accordance with one or more techniques of this disclosure. For convenience, FIG. 6 is described with respect to network system 100 of FIG. 1. However, the techniques of FIG. 6 may be performed by different components of network system 100 of FIG. 1 or by additional or alternative devices.

CUC 102 is configured to output, to CNC 104, a setup request (602). In some examples, the setup request may represent a frame replication and elimination for reliability (FRER) setup request. In some examples, the setup request may indicate one or more endpoints for requested flows. CNC 104 may generate a request to create a TSN flow based on the setup request. CNC 104 may output the request to create the TSN flow to service orchestrator 110 (604). In some examples, the request to create the TSN flow represents a request to create an ultra-reliable low latency (URLLC) TSN slice between a specified pair of endpoints.

In some examples, service orchestrator 110 receives the request to create the TSN flow and translates the request. Service orchestrator 110 may output one or more instructions to configure a network slice based on the intent (606). The network slice may be associated with slice identification data. In some examples, service orchestrator 110 may output the instructions to RAN domain orchestrator 124, transport network domain orchestrator 134, core network domain orchestrator 144, or any combination thereof. Based on the instructions, orchestrators 124, 134, 144 may configure one or more elements in order to support the network slice.

Service orchestrator 110 is configured to output slice identification data to CNC 104 (608). In some examples, the slice identification data may include an S-NSSAI. CNC 104 may forward the slice identification data to CUC 102. CUC 102 may forward the slice identification data to end station 152. End station 152 may forward the slice identification data to a UE device (e.g., first UE device 162 or second UE device 164) (614).

Figure 7:
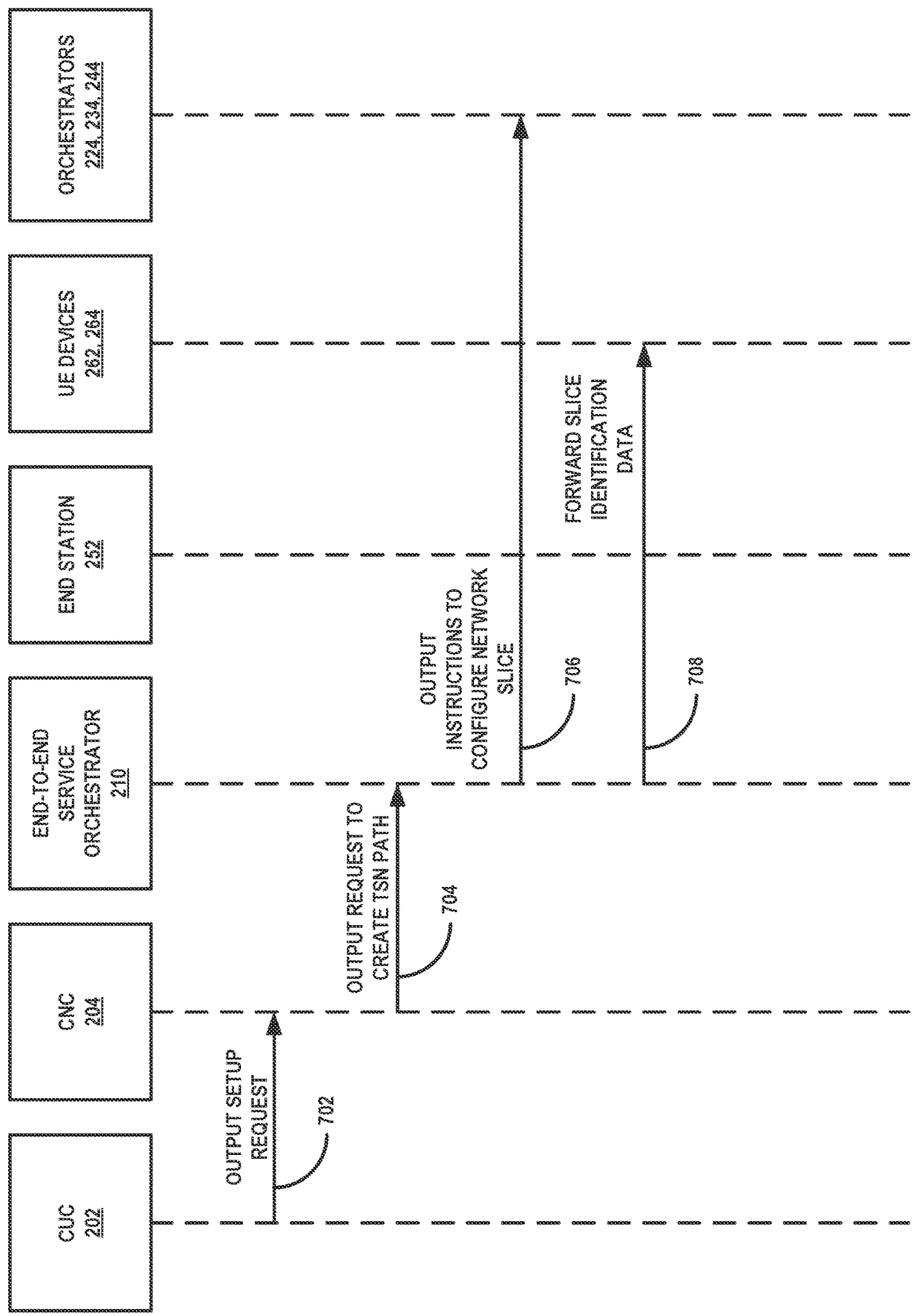
FIG. 7 is a flow diagram illustrating a second example operation for sending network slice identification data to a set of UE devices, in accordance with one or more techniques of this disclosure.

FIG. 7 is a flow diagram illustrating a second example operation for sending network slice identification data to a set of UE devices, in accordance with one or more techniques of this disclosure. For convenience, FIG. 7 is described with respect to network system 200 of FIG. 2. However, the techniques of FIG. 7 may be performed by different components of network system 200 of FIG. 2 or by additional or alternative devices.

CUC 102 is configured to output, to CNC 104, a setup request (702). In some examples, the setup request may represent a FRER setup request. In some examples, the setup request may indicate one or more endpoints for requested flows. CNC 104 may generate a request to create a TSN flow based on the setup request. CNC 104 may output the request to create the TSN flow to service orchestrator 110 (704). In some examples, the request to create the TSN flow represents a request to create a URLLC TSN slice between a specified pair of endpoints.

In some examples, service orchestrator 110 receives the request to create the TSN flow and translates the request. Service orchestrator 110 may output one or more instructions to configure a network slice based on the intent (706). The network slice may be associated with slice identification data. In some examples, service orchestrator 110 may output the instructions to RAN domain orchestrator 124, transport network domain orchestrator 134, core network domain orchestrator 144, or any combination thereof. Based on the instructions, orchestrators 124, 134, 144 may configure one or more elements in order to support the network slice. Service orchestrator 110 is configured to output slice identification data directly to a UE device (e.g., first UE device 262 and/or second UE device 264 (708).

The techniques described in this disclosure may be implemented, at least in part, in hardware, software, firmware or any combination thereof. For example, various aspects of the described techniques may be implemented within one or more programmable processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A network system comprising:
   a service orchestrator for configuring a mobile network to operate as a time sensitive networking (TSN) bridge, wherein the service orchestrator is configured to:
   receive, from a centralized network controller (CNC) for a TSN application, TSN configuration data for a TSN flow between two end station devices for the TSN application;
   generate, based on the TSN configuration data, an intent to create an end-to-end network slice between the two end station devices across the mobile network to transport packets for the TSN flow, the intent comprising information for configuring a plurality of domains of the mobile network comprising a Radio Access Network (RAN) domain, a core network domain, and a transport network domain;
   provision the RAN domain, the core network domain, and the transport network domain of the mobile network with the end-to-end network slice based on the intent, wherein the end-to-end network slice is associated with slice identification data; and
   output, to a user equipment (UE) device attached to the mobile network, the slice identification data to cause the UE device to map packets for the TSN flow, the packets received by the UE device from one of the two end station devices, to the end-to-end network slice.

2. The network system of claim 1, wherein the slice identification data comprises single network slice selection assistance information (S-NSSAI).

3. The network system of claim 1, wherein to output the slice identification data to the UE device, the service orchestrator is configured to output the slice identification data to the CNC, causing the CNC to forward the network slice identification data to the UE device via a centralized user configuration (CUC) and one of the two end station devices.

4. The network system of claim 1, wherein to output the slice identification data to the UE device, the service orchestrator is configured to output the slice identification data directly to the UE device without outputting the slice identification data to the CNC.

5. The network system of claim 1, wherein the end-to-end network slice is provisioned within an end-to-end network that includes the UE device and a physical TSN bridge device.

6. The network system of claim 1, wherein the TSN configuration data is first TSN configuration data, wherein the TSN flow is a first TSN flow, wherein the intent is a first intent, wherein the end-to-end network slice is a first end-to-end network slice, wherein the slice identification data is first slice identification data, wherein the UE device is a first UE device, and wherein the service orchestrator is further configured to:
   receive, from the CNC, second TSN configuration data for a second TSN flow between the two end station devices for the TSN application;
   generate, based on the second TSN configuration data, a second intent to create a second end-to-end network slice between the two end station devices across the mobile network to transport packets for the second TSN flow, the second intent comprising second information for configuring the plurality of domains of the mobile network comprising the RAN domain, the core network domain, and the transport network domain;
   provision the RAN domain, the core network domain, and the transport network domain gf the mobile network with the second end-to-end network slice based on the second intent, wherein the second end-to-end network slice is associated with second slice identification data; and output, to a second UE device attached to the mobile network, the second slice identification data to cause the second UE device to map packets for the second TSN flow, the packets received by the second UE device from one of the two end station devices, to the second end-to-end network slice.

7. The network system of claim 1, wherein the service orchestrator is configured to:
identify, based on the TSN configuration data, the two end station devices; and
generate the intent to create the end-to-end network slice to connect the two end station devices across one or more elements of the RAN domain, the core network domain, and the transport network domain of the mobile network.

8. The network system of claim 1, wherein the mobile network comprises:
a RAN orchestrator configured to manage one or more RAN elements of the RAN domain;
a transport network orchestrator configured to manage one or more forwarding path elements (FPEs) of the transport network domain; and
a core network orchestrator configured to manage one or more core network elements gf the core network domain,
wherein to provision the mobile network with the end-to-end network slice based on the intent, the service orchestrator is configured to leverage the RAN orchestrator to configure the one or more RAN elements, the transport network orchestrator to configure the one or more FPEs, and the core network orchestrator to configure the one or more core network elements to support the end-to-end network slice.

9. The network system of claim 8, wherein to leverage the RAN orchestrator to configure the one or more RAN elements, the service orchestrator is configured to leverage a RAN network slice subnet management function (RAN NSSMF) executing on the RAN orchestrator to create a RAN TSN slice subnet management function for configuring the one or more RAN elements.

10. The network system of claim 8, wherein to leverage the core network orchestrator to configure the one or more core network elements, the service orchestrator is configured to leverage a core network slice subnet management function (CORE NSSMF) executing on the core network orchestrator to create a core TSN slice subnet management function for configuring the one or more core network elements.

11. The network system of claim 8, wherein to leverage the transport network orchestrator to configure the one or more FPEs, the service orchestrator is configured to leverage a transport network-network slice subnet management function (TN-NSSMF) executing on the transport network orchestrator to connect the end-to-end network slice across the one or more FPEs while supporting an amount of bandwidth allocated to the end-to-end network slice.

12. A method comprising:
receiving, by a service orchestrator for configuring a mobile network to operate as a time sensitive networking (TSN) bridge from a centralized network controller (CNC) for a TSN application, TSN configuration data for a TSN flow between two end station devices for the TSN application;

generating, by the service orchestrator based on the TSN configuration data, an intent to create an end-to-end network slice between the two end station devices across the mobile network to transport packets for the TSN flow, the intent comprising information for configuring a plurality of domains of the mobile network comprising a Radio Access Network (RAN) domain, a core network domain, and a transport network domain;
provisioning, by the service orchestrator, the RAN domain, the core network domain, and the transport network domain of the mobile network with the end-to-end network slice based on the intent, wherein the end-to-end network slice is associated with slice identification data; and
outputting, by the service orchestrator to a user equipment (UE) device attached to the mobile network, the slice identification data to cause the UE device to map packets for the TSN flow, the packets received by the UE device from one of the two end station devices, to the end-to-end network slice.

13. The method of claim 12, wherein outputting the slice identification data to the UE device comprises outputting, by the service orchestrator, the slice identification data to the CNC, causing the CNC to forward the network slice identification data to the UE device via a centralized user configuration (CUC) and one of the to end station devices.

14. The method of claim 12, wherein outputting the slice identification data to the UE device comprises outputting, by the service orchestrator the slice identification data directly to the UE device without outputting the slice identification data to the CNC.

15. The method of claim 12, wherein the TSN configuration data is first TSN configuration data, wherein the TSN flow is a first TSN flow, wherein the intent is a first intent, wherein the end-to-end network slice is a first end-to-end network slice, wherein the slice identification data is first slice identification data, wherein the UE device is a first UE device, and wherein the method further comprises:
receiving, by the service orchestrator from the CNC, second TSN configuration data for a second TSN flow between the two end station devices for the TSN application;
generating, by the service orchestrator based on the second TSN configuration data, a second intent to create a second end-to-end network slice between the two end station devices across the mobile network to transport packets for the second TSN flow, the second intent comprising second information for configuring the plurality of domains of the mobile network comprising the RAN domain, the core network domain, and the transport network domain;
provisioning, by the service orchestrator, the RAN domain, the core network domain, and the transport network domain of the mobile network with the second end-to-end network slice based on the second intent, wherein the second end-to-end network slice is associated with second slice identification data; and
outputting, by the service orchestrator to a second UE device attached to the mobile network, the second slice identification data to cause the second UE device to map packets for the second TSN flow, the packets received by the second UE device from one of the two end station devices, to the second end-to-end network slice.

16. The method of claim 12, wherein the method further comprises:

identifying, by the service orchestrator based on the TSN configuration data, two end station devices; and generating, by the service orchestrator, the intent to create the end-to-end network slice to connect the two end station devices across one or more elements of the RAN domain, the core network domain, and the transport network domain of the mobile network.

17. The method of claim 12, wherein provisioning the mobile network with the end-to-end network slice based on the intent comprises:

leveraging a RAN orchestrator, configured to manage one or more RAN elements of the RAN domain, to configure the one or more RAN elements to support the end-to-end network slice;

leveraging a transport network orchestrator, configured to manage one or more forwarding path elements (FPEs) of the transport network domain, to configure the one or more FPEs to support the end-to-end network slice; and leveraging a core network orchestrator, configured to manage one or more core network elements of the core network domain, to configure the one or more core network elements to support the end-to-end network slice.

18. Non-transitory computer-readable media comprising instructions for causing one or more processors of a service orchestrator for configuring a mobile network to operate as a time sensitive networking (TSN) bridge, wherein the service orchestrator is configured to:

receive, from a centralized network controller (CNC) for a TSN application, TSN configuration data for a TSN flow between two end station devices for the TSN application;

generate, based on the TSN configuration data, an intent to create an end-to-end network slice between the two end station devices across the mobile network to transport packets for the TSN flow, the intent comprising information for configuring a plurality of domains of the mobile network comprising a Radio Access Network (RAN) domain, a core network domain, and a transport network domain;

provision the RAN domain, the core network domain, and the transport network domain gf the mobile network with the end-to-end network slice based on the intent, wherein the end-to-end network slice is associated with slice identification data; and output, to a user equipment (UE) device attached to the mobile network, the slice identification data to cause the UE device to map packets for the TSN flow, the packets received by the UE device from one of the two end station devices, to the end-to-end network slice.

* * * * *